US011269827B1

(12) United States Patent
Bradley et al.

(10) Patent No.: US 11,269,827 B1
(45) Date of Patent: Mar. 8, 2022

(54) SYSTEMS, METHODS, AND COMPUTER PRODUCTS FOR MODEL-BASED QUERY ASSIGNMENT

(71) Applicant: Federal Home Loan Mortgage Corporation, McLean, VA (US)

(72) Inventors: Michael G Bradley, McLean, VA (US); James Douglas Gordon, McLean, VA (US); Stanislav Kornienko, McLean, VA (US); Gary Skinner, McLean, VA (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 616 days.

(21) Appl. No.: 16/050,579

(22) Filed: Jul. 31, 2018

Related U.S. Application Data

(60) Provisional application No. 62/539,132, filed on Jul. 31, 2017.

(51) Int. Cl.
| | |
|---|---|
| *G06F 16/21* | (2019.01) |
| *G06F 16/903* | (2019.01) |
| *G06F 16/215* | (2019.01) |
| *G06N 5/00* | (2006.01) |
| *G06Q 20/40* | (2012.01) |
| *G06Q 40/02* | (2012.01) |

(52) U.S. Cl.
CPC .......... *G06F 16/219* (2019.01); *G06F 16/215* (2019.01); *G06F 16/903* (2019.01); *G06N 5/00* (2013.01); *G06Q 20/4016* (2013.01); *G06Q 40/025* (2013.01)

(58) Field of Classification Search
CPC .... G06F 16/219; G06F 16/903; G06F 16/215; G06F 16/21; G06N 5/00; G06Q 20/4016; G06Q 40/025; G06C 40/025
See application file for complete search history.

(56) References Cited

U.S. PATENT DOCUMENTS

| | | | |
|---|---|---|---|
| 6,988,082 B1 * | 1/2006 | Williams | G06Q 40/025 705/36 T |
| 7,593,893 B1 * | 9/2009 | Ladd | G06Q 40/02 701/1 |

(Continued)

*Primary Examiner* — Aleksandr Kerzhner
*Assistant Examiner* — Maher N Algibhah
(74) *Attorney, Agent, or Firm* — Finnegan, Henderson, Farabow, Garrett & Dunner LLP

(57) ABSTRACT

A system is disclosed that includes a database and a processor in communication with the database. The processor is configured to maintain a data structure comprising historical value data and historical condition data and receive a query requesting a streamlined process. The processor is further configured to, based on the query, make a first assessment whether a submitted value ratio is within a predetermined range of a modeled value ratio; make a second assessment whether the modeled value ratio exceeds a predetermined maximum; and, based on the first assessment and the second assessment, assign a first flag to the query. The processor is further configured to based on the query, instantiate a condition model by obtaining the historical condition data; assign a second flag to the query; and based on the first flag and the second flag, determine whether to assign the query to the streamlined process.

18 Claims, 6 Drawing Sheets

(56) References Cited

U.S. PATENT DOCUMENTS

| | | | |
|---|---|---|---|
| 7,702,580 B1* | 4/2010 | Voth | G06Q 40/025 |
| | | | 705/40 |
| 8,660,943 B1* | 2/2014 | Chirehdast | G06Q 40/00 |
| | | | 705/38 |
| 2003/0041019 A1* | 2/2003 | Vagim | G06Q 40/02 |
| | | | 705/38 |
| 2005/0075961 A1* | 4/2005 | McGill | G06Q 40/06 |
| | | | 705/35 |
| 2006/0271473 A1* | 11/2006 | Pollock | G06Q 40/02 |
| | | | 705/38 |
| 2008/0183515 A1* | 7/2008 | Chheda | G06Q 40/025 |
| | | | 705/38 |
| 2009/0299911 A1* | 12/2009 | Abrahams | G06Q 40/00 |
| | | | 705/36 R |
| 2010/0005019 A1* | 1/2010 | Yang | G06Q 40/00 |
| | | | 705/35 |
| 2010/0106639 A1* | 4/2010 | Banerjee | G06Q 40/00 |
| | | | 705/38 |
| 2010/0131426 A1* | 5/2010 | Kroutik | G06Q 40/04 |
| | | | 705/36 R |
| 2011/0178906 A1* | 7/2011 | Joye | G06Q 40/00 |
| | | | 705/35 |
| 2013/0290195 A1* | 10/2013 | Frazier | G06Q 30/0278 |
| | | | 705/306 |
| 2013/0297489 A1* | 11/2013 | Showalter | G06Q 40/025 |
| | | | 705/38 |
| 2014/0058915 A1* | 2/2014 | Hinesley | G06Q 40/06 |
| | | | 705/35 |
| 2014/0279404 A1* | 9/2014 | Kallimani | G06Q 40/025 |
| | | | 705/38 |
| 2014/0358943 A1* | 12/2014 | Raymond | G06Q 10/10 |
| | | | 707/748 |
| 2015/0112854 A1* | 4/2015 | Guriel | G06Q 40/025 |
| | | | 705/38 |
| 2016/0247234 A1* | 8/2016 | Bendel | G06Q 30/0202 |
| 2017/0206365 A1* | 7/2017 | Garcia | G06F 21/6245 |
| 2017/0262852 A1* | 9/2017 | Florimond | G06Q 20/405 |
| 2019/0019250 A1* | 1/2019 | Martinho | G06Q 40/025 |

* cited by examiner

SYSTEMS, METHODS, AND COMPUTER PRODUCTS FOR MODEL-BASED QUERY ASSIGNMENT

CROSS-REFERENCE TO RELATED APPLICATIONS

This Application claims the benefit of priority to U.S. provisional Application No. 62/539,132, filed Jul. 31, 2017.

BACKGROUND

Many purchasers of property obtain funds for the purchase by taking out a loan from a lender. In exchange, the purchaser grants the lender a security interest in the property; that is, the property serves as collateral. The legal document by which the purchaser uses the property as collateral for repayment of the loan is commonly known as a mortgage or mortgage loan. Lenders may sell mortgage loans that they originate into what is known as the secondary mortgage market. Example participants in the secondary mortgage market are the Federal Home Loan Mortgage Corporation (Freddie Mac), the Federal National Mortgage Association (Fannie Mae), and the Government National Mortgage Association (Ginnie Mae).

In order to evaluate a risk associated with purchasing a particular mortgage loan, participants in the secondary loan market typically ascertain a value of the property serving as collateral for the mortgage loan through, for example, an appraisal. While some participants in the secondary loan market rely on systems to generate appraisals and evaluate risks associated with purchasing mortgage loans, these systems typically can process only limited, static data provided by, for example, a professional appraiser. However, this labor-intensive process is inefficient and unable to process large numbers of loans as quickly as the market demands.

SUMMARY

Disclosed are systems, methods, and computer products for model-based assignment of queries, such as queries in the secondary mortgage market.

Unlike systems typically used in the secondary mortgage market to generate appraisals and evaluate risks associated with purchasing mortgage loans, the disclosed systems, methods, and computer products are configured to aggregate and process a wide array of dynamic data maintained in data structures at a database. Using these data structures, the disclosed systems, methods, and computer products may instantiate models modeling value data, condition data, and/or fraud data associated with a query and, based on the instantiated models, determine whether to assign the query to a streamlined process. The streamlined process may, for example, permit efficient evaluation of risks associated with purchasing mortgage loans.

In some embodiments, a system is disclosed that includes a database, a processor in communication with the database, and a memory device in communication with the processor. The memory device stores instructions that, when executed by the processor, perform operations including maintaining at the database a data structure comprising historical value data and historical condition data and receiving a query requesting a streamlined process, where the query comprises submitted value data. The operations further include, based on the query, instantiating a value model by obtaining the historical value data from the database and determining, based on the value data, a modeled value ratio; determining, based on the submitted value data, a submitted value ratio; making a first assessment whether the submitted value ratio is within a predetermined range of the modeled value ratio; making a second assessment whether the modeled value ratio exceeds a predetermined maximum; and, based on the first assessment and the second assessment, assigning a first flag to the query. The operations further include, further based on the query, instantiating a condition model by obtaining the historical condition data from the database and, based on the historical condition data, assigning a second flag to the query. The operations still further include, based on the first flag and the second flag, determining whether to assign the query to the streamlined process.

In other embodiments, a method is disclosed. The method includes maintaining at a database a data structure comprising historical value data and historical condition data and receiving a query requesting a streamlined process, where the query comprises submitted value data. The operations further include, based on the query, instantiating a value model by obtaining the historical value data from the database and determining, based on the value data, a modeled value ratio; determining, based on the submitted value data, a submitted value ratio; making a first assessment whether the submitted value ratio is within a predetermined range of the modeled value ratio; making a second assessment whether the modeled value ratio exceeds a predetermined maximum; and, based on the first assessment and the second assessment, assigning a first flag to the query. The operations further include, further based on the query, instantiating a condition model by obtaining the historical condition data from the database and, based on the historical condition data, assigning a second flag to the query. The operations still further include, based on the first flag and the second flag, determining whether to assign the query to the streamlined process.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings.

The disclosed systems, methods, and computer-readable media include a query system configured to assign queries. The queries may be, for example, queries associated with a mortgage loan received from, for example, a participant in the primary or secondary mortgage market. Assigning the queries may involve, for example, assigning the queries to one of a streamlined process and a non-streamlined process. The streamlined process may, for example, require less processing power and/or less human involvement than the non-streamlined process. For example, in the context of the primary or secondary mortgage market, a streamlined process may obviate the need for a human appraisal and/or a drive-by inspection for approval of the mortgage loan. Other examples are possible as well.

The disclosed systems, methods, and computer-readable media may be configured to maintain a database that includes data structures. The data structures may include, for example, value data, condition data, and/or fraud data. The disclosed systems, methods, and computer-readable media may be configured to instantiate models based on the value data, condition data, and/or fraud data and, based on the instantiated models, determine whether to assign a query to the streamlined or non-streamlined process.

Figure 1:
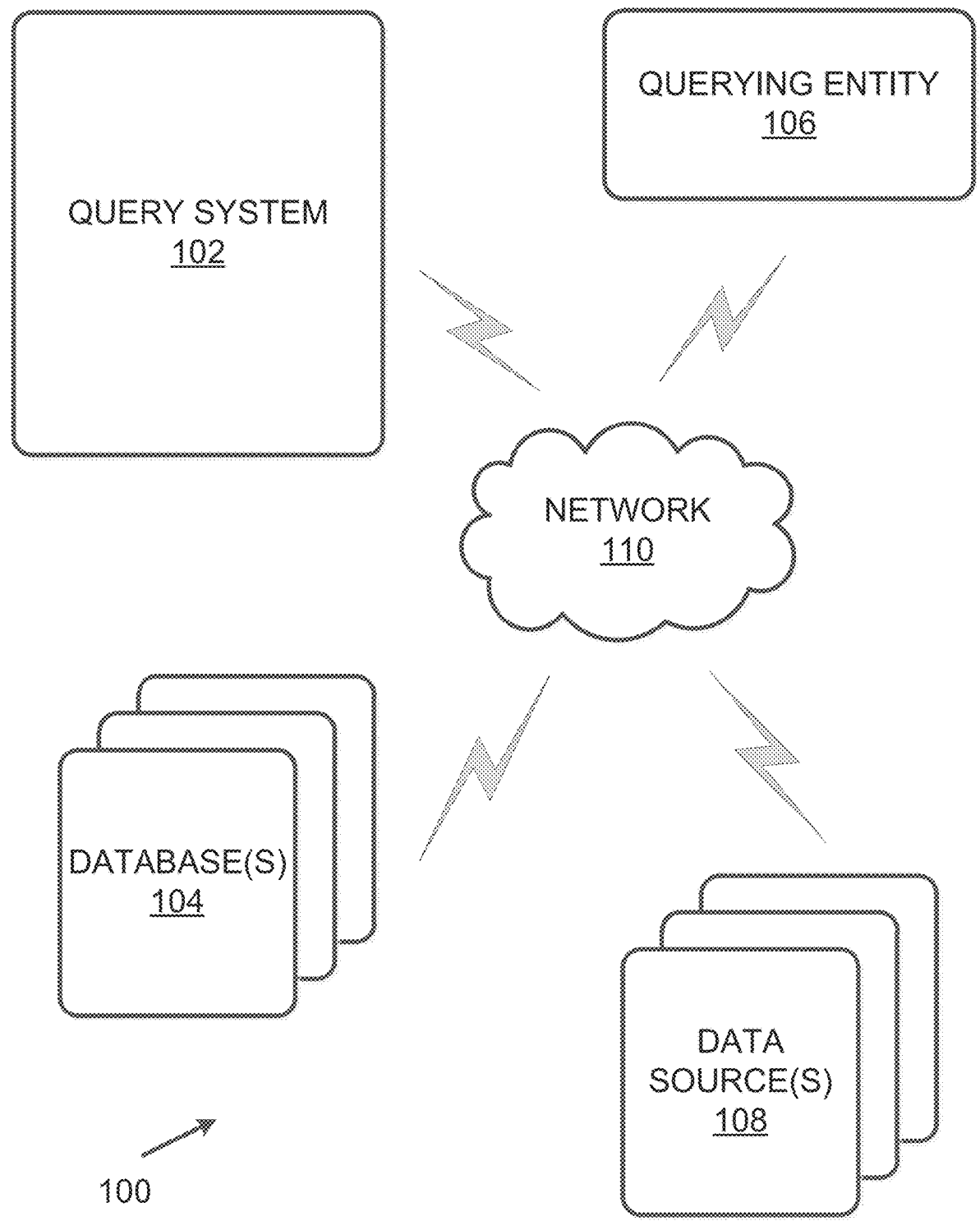
FIG. 1 is a block diagram of an exemplary system for model-based assignment of queries, consistent with disclosed embodiments.

FIG. 1 is a block diagram of an exemplary system 100 for model-based assignment of queries, consistent with disclosed embodiments. System 100 may be configured for performing model-based query assignment processes consistent with disclosed embodiments. In some embodiments, system 100 may be configured to assign queries to a streamlined or non-streamlined process based one or more instantiated models. For example, system 100 may be configured to assign a query associated with a mortgage loan eligible for purchase in the secondary mortgage market to a non-streamlined process involving a human appraisal or a streamlined process that does not involve a human appraisal.

Other examples are possible as well. In some embodiments, the models instantiated by system 100 may include models modeling features associated with a property serving as collateral for the mortgage loan. For example, a value model may model a market value of the property and any associated risk, such as a risk that the property has been over- or under-valued by the purchaser and seller and/or a risk that the mortgage loan exceeds the market value. As another example, a condition model may model a condition of the property and any associated risk, such as a risk that the condition of the property may be poor, deteriorating, questionable, and/or unknown. As still another example, a fraud model may a risk of connected with the property, such as a risk that the property has been or will be involved in fraudulent activity. The system 100 may use some or all of the models and may use the models serially and/or in parallel during query assignment.

As shown, system 100 may include a query system 102, database(s) 104, a querying entity 106, data source(s) 108. As shown, query system 102, database 104, querying entity 106, and data sources 108 may be communicatively coupled by a network 110.

While only one query system 102 and querying entity 106, and network 110 are shown, it will be understood that system 100 may include more than one of any of these components. Similarly, while certain numbers of database(s) 104 and data source(s) 108 are shown, it will be understood that system 100 may include any number of either of these components. More generally, the components and arrangement of the components included in system 100 may vary. Thus, system 100 may include other components that perform or assist in the performance of one or more processes consistent with the disclosed embodiments.

Query system 102 may be one or more computing devices configured to perform operations consistent with maintaining database(s) 104, receiving a query from querying entity 106, instantiating a value model, condition model, and/or fraud model based on the query, and determining whether to assign the query to a streamlined process. For example, query system 104 may be configured to perform any of the model-based query assignment processes described below in connection with FIGS. 4A-4D. An example query system is further described below in connection with FIG. 2.

Database(s) 104 may be one or more computing devices configured to perform operations consisted with storing data structures, such as data structures that include historical value data, historical condition data, and/or historical fraud data.

Historical value data may include any data usable to estimate a market value of the property. For example, the historical data may include historical sale data for the property and/or similar (e.g., in a local market, such as a ZIP® code) properties (e.g., listing prices, sales prices, days on the market, MLS data, etc.), property characteristics of the property (e.g., square footage, lot size, number of bedrooms, number of bathrooms, appliances, backyard features, additions, walkability, etc.), repeat sales data indicating price variation of the property and/or similar properties (e.g., as compared to an appreciation or depreciation rate for other homes in the local market), hedonic value estimates based on subject property characteristics and characteristics of other local properties, prior appraisal data for the property, and/or public records associated with the property, such as quality ratings, an age of the property, and/or tax assessment data. Other historical value data is possible as well.

Historical condition data may include any data usable to estimate a current, past, or future condition of the property. For example, the condition data may include data describing a last-known condition and/or quality rating of the property, an previous unacceptable findings for the property, data associated with zoning of the property, property characteristics of the property, repeat sales data, prior appraisal data, and/or public records associated with the property. Other historical condition data is possible as well.

Historical fraud data may include any data usable to estimate a risk of current, past, or future fraud associated with the property. For example, the fraud data may include public records associated with the property, repeat sales data, and/or data indicating whether the sale of the property was an arms-length transaction. In some embodiments, database(s) 104 may be further configured to provide the historical value data, historical condition data, and/or historical fraud data to query system 104 for use in a model-based query assignment process.

The historical value data, historical condition data, and/or historical fraud data may be aggregated by database(s) 104 from, for example, data source(s) 108. Data source(s) 108 may include, for example one or more data sources associated with querying system 102, one or more public data sources, and/or one or more third-party data sources. In the context of the secondary mortgage market, for example, data source(s) 108 may include one or more of database(s) provided by Freddie Mac and/or other government sponsored enterprises or government agencies (e.g., Uniform Collateral Data Portals, Freddie Mac's Home Value Explorer®, repeat sales databases, appraisal databases, etc.), public records databases, Multiple Listing Service (MLS) databases, and/or third-party fraud databases, such as those provided by CoreLogic, DataVerify, and/or First American. Other data source(s) 108 are possible as well.

In some embodiments, database(s) 104 may be configured to receive data from data source(s) 108 continuously (e.g., in a "push" fashion), occasionally, periodically, and/or upon request. Database(s) 104 may be further configured to aggregate, sort, and/or review the data to create data structures. Data structures may be, for example, searchable by database (s) 104 and/or query system 102. In some embodiments, the data structures may be searchable for, for example, property, local market, date, and/or other criteria.

While database(s) 104 is shown to be separate from query system 102, in some embodiments some or all of database(s) 104 may be included in query system 102. Similarly, while data source(s) 108 is shown to be separate from database(s) 104 and query system 102, in some embodiments some or all of data source(s) 108 may be included in database(s) 104 and/or query system 102.

Data source(s) 108 and/or database(s) 104 may include one or more memory devices that store information and are accessed and/or managed through database(s) 104 and/or query system 102. In some embodiments, data source(s) 108 and/or database(s) 104 may be similar to, for example, Oracle™ databases, Sybase™ databases, or other relational databases or non-relational databases, such as Hadoop sequence files, HBase, or Cassandra. Such database(s) 104 and/or data source(s) 108 may include computing components (e.g., database management system, database server, etc.) configured to maintain data structures, receive and process requests for data stored in memory devices of the database(s) 104 and/or data source(s) 108, and to provide data from the database(s) 104 and/or data source(s) 108. Alternatively or additionally, database(s) 104 and/or data source(s) 108 may include cloud-based storage accessible by query system 102 and/or database(s) 104 over network 112 and/or another network.

Querying entity 106 may be one or more computing devices and/or a user associated with one or more computing devices configured to provide to query system 102 a query requesting a streamlined process. For example, querying entity 106 may be a participant in or other party associated with the secondary mortgage market, such as a lender. The streamlined process may be, for example, a streamlined process to evaluate a risk associated with purchasing a particular mortgage loan. For example, the streamlined process may evaluate a risk associated with purchasing the mortgage loan without and/or with reduced human input as compared to a non-streamlined process.

The query may include submitted value data. The submitted value data may reflect, for example, a purchase price agreed upon by a buyer and a seller of the property that will serve as collateral for the mortgage loan and/or a value of the mortgage loan or an estimated value submitted by a borrower or lender. Alternatively or additionally, the submitted value data may include data describing the property, such as a property address or other attributes. Other submitted value data are possible as well.

Network 110 may be any type of network configured to provide communication between components of system 100. For example, network 110 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
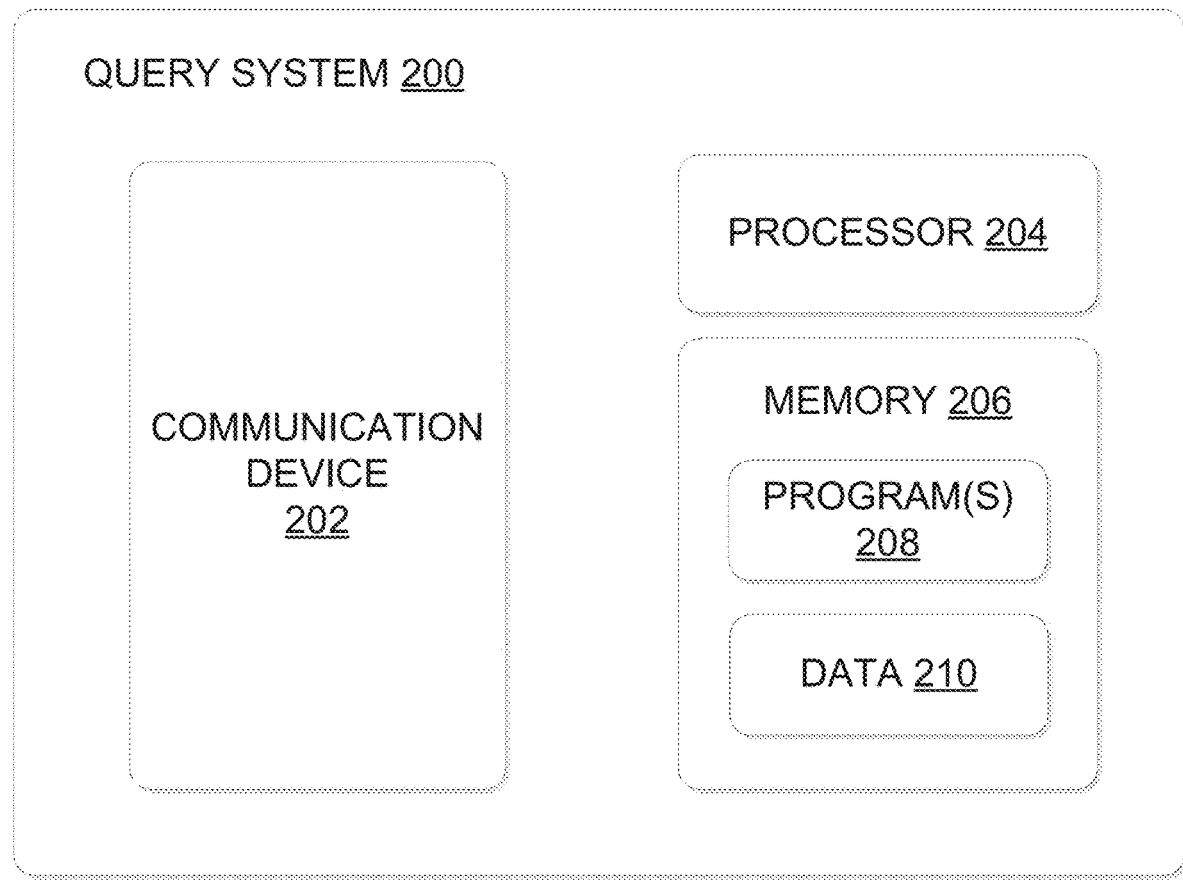
FIG. 2 is a block diagram of an exemplary query system, consistent with disclosed embodiments.

FIG. 2 is a block diagram of an exemplary query system 200, consistent with disclosed embodiments. Query system 200 may, for example, be similar to query system 102 described above. As shown, query system 200 may include a communication device 202, one or more processor(s) 204, and memory 206 including one or more program(s) 208 and data 210. Query system 202 may take the form of a server, general purpose computer, mainframe computer, or any combination of these components. Other implementations consistent with disclosed embodiments are possible as well.

Communication device 202 may be configured to communicate with one or more entities. For example, in some embodiments, communication device 202 may be configured to communicate with one or more database(s), such as database(s) 104 described above. In some embodiments, communication device 202 may be configured to communicate with the database(s) to maintain at the database(s) one or more data structures that include historical value data, historical condition data, and/or historical fraud data, as described above.

Communication device 202 may be further configured to communicate with one or more querying entities, such as querying entity 106 described above. In some embodiments, communication device 202 may be configured to receive from the querying entities queries requesting streamlined processes. In some embodiments, the querying entity may be a participant in or other party associated with the secondary mortgage market, and the streamlined process may be a streamlined process to evaluate a risk associated with purchasing a particular mortgage loan. The query may include submitted value data, such as a purchase price agreed upon by a buyer and a seller of the property that will serve as collateral for the mortgage loan.

Communication device 202 may also be configured to communicate with other components. In general, communication device 202 may be configured to provide communication over a network, such as network 110 described above. To this end, communication device 202 may include, for example, one or more digital and/or analog devices that allow query system 200 to communicate with and/or detect other components, such as a network controller and/or wireless adaptor for communicating over the Internet. Other implementations consistent with disclosed embodiments are possible as well.

Processor(s) 204 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands required of different components of query system 200.

Memory 206 may include one or more storage devices configured to store instructions used by processor(s) 204 to perform functions related to disclosed embodiments. For example, memory 206 may be configured with one or more software instructions, such as program(s) 208, that may perform one or more operations when executed by processor(s) 204. The disclosed embodiments are not limited to separate programs or computers configured to perform dedicated tasks. For example, memory 206 may include a single program 208 that performs the functions of query system 200, or program(s) 208 may comprise multiple programs. Memory 206 may also store data 210 that is used by program(s) 208. In some embodiments, for example, data 210 may include historical value data, historical condition data, and/or historical fraud data. Alternatively or additionally, in some embodiments data 210 may include a value models, condition models, and/or fraud models instantiated by query system 200, as described below. Other data 210 is possible as well. Alternatively, in some embodiments, some or all of data 210 may be stored in one or more database(s) accessible by query system 200, such as database(s) 104 described above.

In certain embodiments, memory 6208 may store sets of instructions for carrying out the processes described below in connection with FIGS. 4A-4D. Other instructions are possible as well. In general, instructions may be executed by processor(s) 204 to perform one or more processes consistent with disclosed embodiments.

The components of query system 200 may be implemented in hardware, software, or a combination of both hardware and software, as will be apparent to those skilled in the art. For example, although one or more components of query system 200 may be implemented as computer processing instructions, all or a portion of the functionality of query system 200 may be implemented instead in dedicated electronics hardware.

Figure 3:
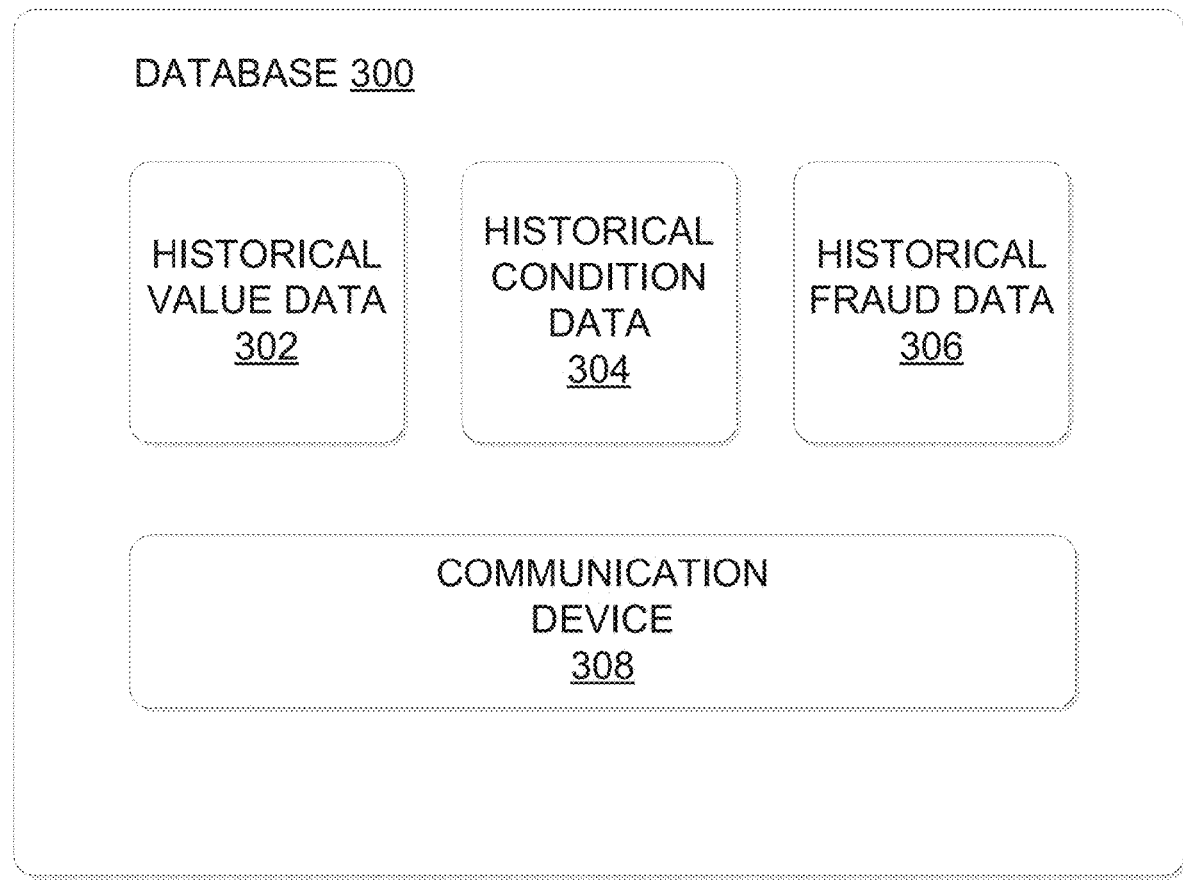
FIG. 3 is a block diagram of an exemplary database, consistent with disclosed embodiments.

FIG. 3 is a block diagram of an exemplary database 300, consistent with disclosed embodiments. Database 300 may, for example, be similar to database(s) 104 described above. As shown, database 300 includes data structures storing historical value data 302, historical condition data 304, and historical fraud data 306, as well as a communication device 308.

Historical value data 302 may be a data structure including historical value data aggregating from any number of data sources, such as data source(s) 108 described above. Similarly, historical condition data 304 may be a data structure including historical condition data aggregated from any number of data sources, such as data source(s) 108 described above. Historical fraud data 306 may be a data structure including historical fraud data aggregated from any number of data sources, such as data source(s) 108 described above. Historical value data 302, historical condition data 304, and historical fraud data 308 may take any of the forms described above.

Each of historical value data 302, historical condition data 304, and historical fraud data 306 may be in the form of a data structure, such as an array, linked list, record, union, class, or tree structure. Historical value data 302, historical condition data 304, and historical fraud data 306 may be stored together in a single data structure and/or in separate data structures. Historical value data 302, historical condition data 304, and historical fraud data 306 may take other forms as well.

In some embodiments, database 300 may be configured to aggregate and maintain historical value data 302, historical condition data 304, and historical fraud data 306. For example, database 300 may be configured to retrieve historical value data 302, historical condition data 304, and/or historical fraud data 306 from one or more additional data sources, such as data source(s) 108 described above. Historical value data 302, historical condition data 304, and historical fraud data 306 may be received by database 300 through, for example, communication device 308.

Communication device 308 may be any device configured to communicate with one or more data source(s) to retrieve historical value data 302, historical condition data 304, and/or historical fraud data 306. Communication device 308 may take any of the forms described above for communication device 202. In general, communication device 308 may be configured to provide communication over a network, such as network 110 described above. To this end, communication device 308 may include, for example, one or more digital and/or analog devices that allow database 300 to communicate with and/or detect other components, such as a network controller and/or wireless adaptor for communicating over the Internet. Other implementations consistent with disclosed embodiments are possible as well.

The components of database 300 may be implemented in hardware, software, or a combination of both hardware and software, as will be apparent to those skilled in the art. For example, although one or more components of database 300 may be implemented as computer processing instructions, all or a portion of the functionality of database 300 may be implemented instead in dedicated electronics hardware.

Figure 4A:
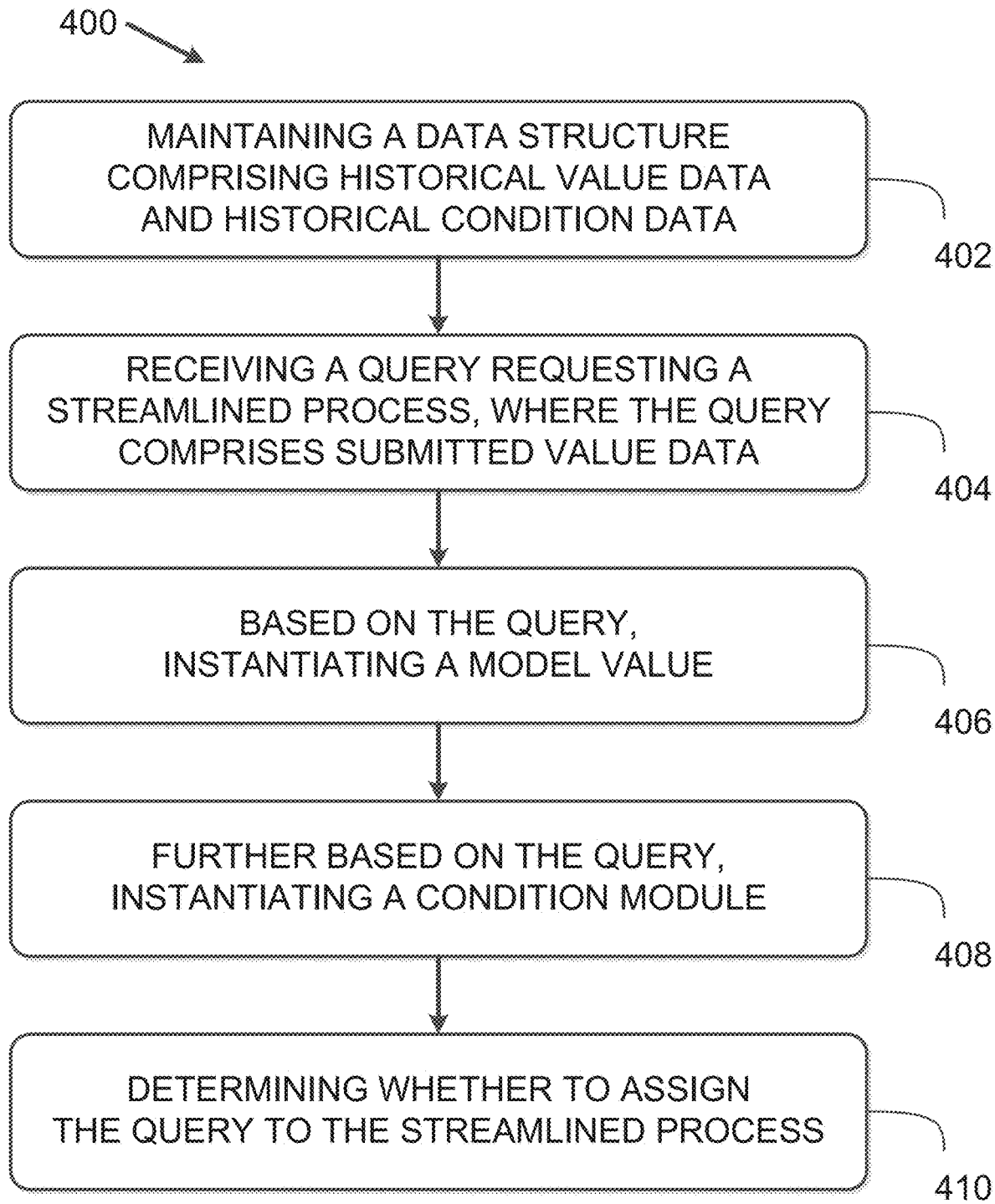
FIGS. 4A-4D are flowcharts of exemplary model-based query assignment processes, consistent with disclosed embodiments.

FIG. 4A is a flowchart of an exemplary model-based query assignment process 400, consistent with disclosed embodiments. Process 400 may be carried out by a query system, such as query systems 102 and 200 described above.

As shown in FIG. 4, process 400 includes at step 402 maintaining a data structure comprising historical value data and historical condition data. In some embodiments, the historical value data and the historical condition data may be maintained at a database, such as databases 104 and 300 described above.

Process 400 further includes, at step 404, receiving a query requesting a streamlined process, where the query includes a submitted value data. In some embodiments, the query may be received from a querying entity, such as querying entity 106 described above. The submitted value data may reflect, for example, a purchase price agreed upon by a buyer and a seller of the property that will serve as collateral for the mortgage loan. Other submitted value data are possible as well, for example an estimated value from a borrower or lender.

At step 406, process 400 further includes, based on the query, instantiating a value model. The value model may be, for example, a model modeling a value of the property that will serve as collateral for the mortgage loan and/or a risk associated with purchasing the mortgage loan that is related to the value. For instance, the model may indicate that the submitted value deviates too much from a modeled value of the property, which creates a risk that the purchase price agreed upon by the buyer and the seller does not reflect a market value of the property. Alternatively or additionally, the model may indicate that a ratio of the mortgage loan to the modeled value is too high, which creates a risk that the purchase price agreed upon by the buyer and the seller does not reflect a market value of the property.

Figure 4B:
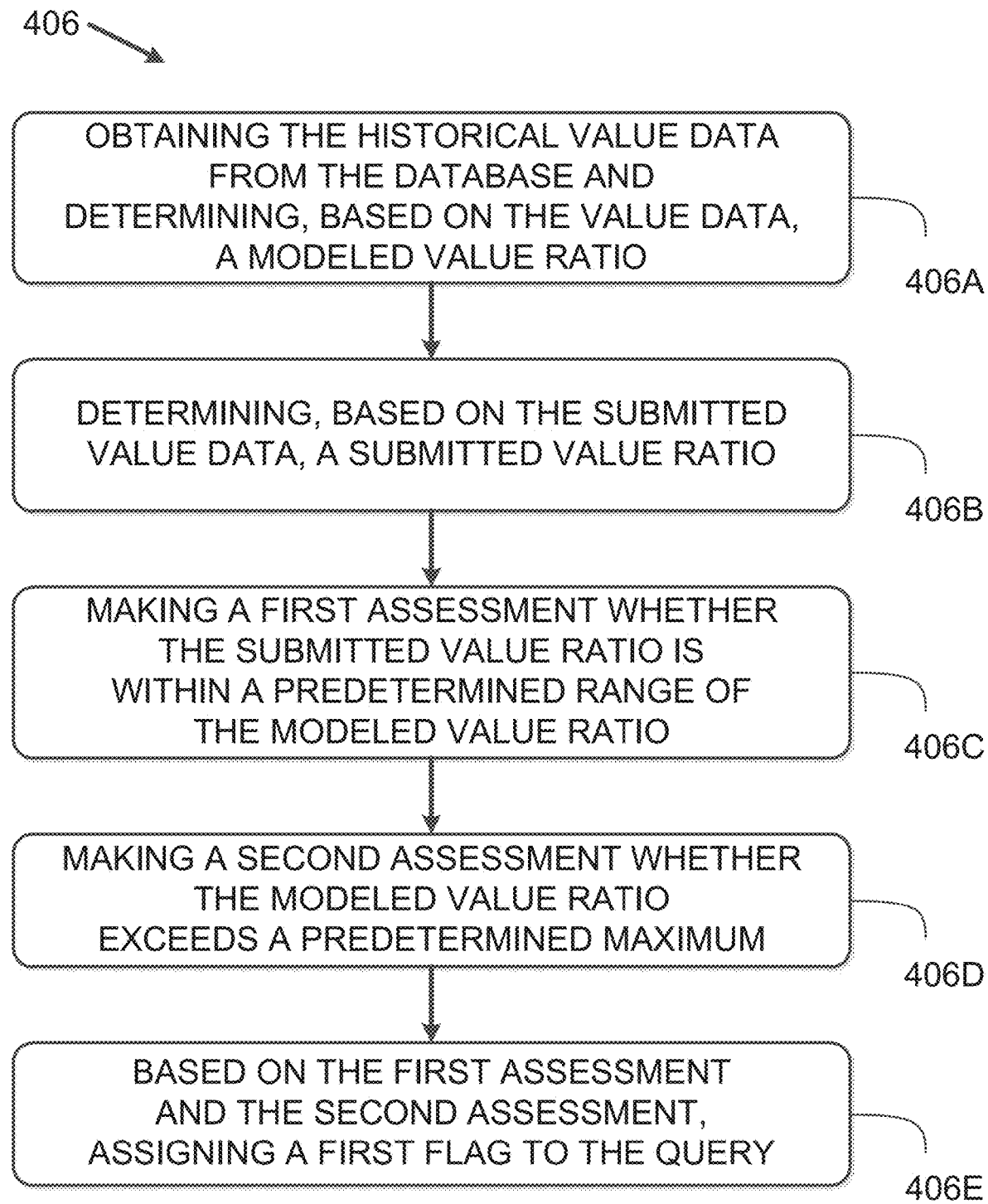

Instantiating the value model is further described in connection with FIG. 4B. As shown in FIG. 4B, instantiating the value model may involve, at step 406A, obtaining the historical value data from the database. The historical value data may take any of the forms described above. Step 406A further includes determining, based on the value data, a modeled value ratio. For example, the query system may determine, based on the historical value data, a modeled value for the property. The modeled value may be a single value or a range of values, such as a probability distribution. The modeled value may be determined based on, for example, one or more factors associated with the property and/or its location, such as historical appreciation and/or depreciation in the location and/or for similar properties, square footage and/or lot size of the property, etc.

In some embodiments, the modeled value may be obtained using a software module included in and/or accessible by the query system. For example, the modeled value may be determined in connection with an automated valuation model (AVM) product, such as Freddie Mac's Home Value Explorer® system. In some embodiments, the value model may employ one or more additional models, such as a repeat sales model (e.g., as offered by Freddie Mac or Fannie Mae, or an AVM vendor) configured to employ statistical modeling to estimate appreciation and/or depreciation of property values over time and a hedonic model configured to estimate property value based on a number of property characteristics (e.g., square footage, a number of bedrooms, etc.). In some embodiments, the automated valuation model and/or the instantiated value model may weight factors according to reliability, information availability and/or recentness, or according to other metrics. Based on the modeled value, the query system may determine the modeled value ratio. The modeled value ratio may be, for example, a loan-to-value (LTV) ratio that reflects a ratio of the mortgage loan to the modeled value. The LTV may compare the mortgage loan value to the minimum of the modeled value. Other modeled value ratios are possible as well.

Instantiating the value model may further involve, at step 406B, determining, based on the submitted data value, a submitted value ratio. The submitted value ratio may be, for example, a loan-to-value (LTV) ratio that reflects a ratio of the mortgage loan to the submitted value. Other submitted value ratios are possible as well.

At step 406C, the query system may make a first assessment whether the submitted value ratio is within a predetermined range of the modeled value ratio. Such an assessment may indicate, for example, whether the submitted value deviates too much from a modeled value of the property, which creates a risk that the purchase price agreed upon by the buyer and the seller does not reflect a market value of the property. For instance, the first assessment way determine whether the submitted value ratio is within 20% below the modeled value ratio and within 10% or 15% above the modeled value ratio (e.g., depending on whether the sale of the property is a purchase or a non-cashout refinance).

At step 406D, the query system may make a second assessment whether the modeled value ratio exceeds a predetermined maximum, such as a credit policy maximum (e.g., 83%). Such an assessment may indicate, for example, whether a ratio of the mortgage loan to the modeled value is too high, which creates a risk that the purchase price agreed upon by the buyer and the seller does not reflect a market value of the property. Other predetermined maximums are possible as well.

Instantiating the value model may further involve, at step 406E, assigning a first flag to the query based on the first assessment and the second assessment. In some embodiments, if the first assessment and the second assessment indicate that there is an acceptable risk associated with the mortgage loan, the first flag may indicate that the query should be assigned to the streamlined process. For instance, if the submitted value ratio is within the predetermined range of the modeled value ratio and the modeled value ratio does not exceed the predetermined maximum, the first flag may be an instruction to assign the query to the streamlined process. Alternatively or additionally, if either of the first assessment and the second assessment indicates that a risk associated with the mortgage loan is unacceptable (e.g., is too high), the first flag may indicate that the query should not be assigned to the streamlined process. For instance, if the submitted value ratio is not within the predetermined range of the modeled value ratio or the modeled value ratio exceeds the predetermined maximum, the first flag may be an instruction not to assign the query to the streamlined process.

In some embodiments, instantiating the value model may include additional analyses, such as whether the sale of the property is a purchase, a non-cashout refinance, or a cashout refinance and whether the submitted value ratio exceeds a predetermined threshold (e.g., 80%). Other analyses are possible as well.

Returning to FIG. 4A, process 400 further includes, at step 408, further based on the query, instantiating a condition model. The condition model may be, for example, a model modeling a condition of the property that will serve as collateral for the mortgage loan and/or a risk associated with purchasing the mortgage loan that is related to the condition. For instance, the model may indicate that the property may be in poor, deteriorating, questionable, and/or unknown condition, which creates a risk that the property may not have a market value sufficient to serve as collateral for the mortgage loan.

Figure 4C:
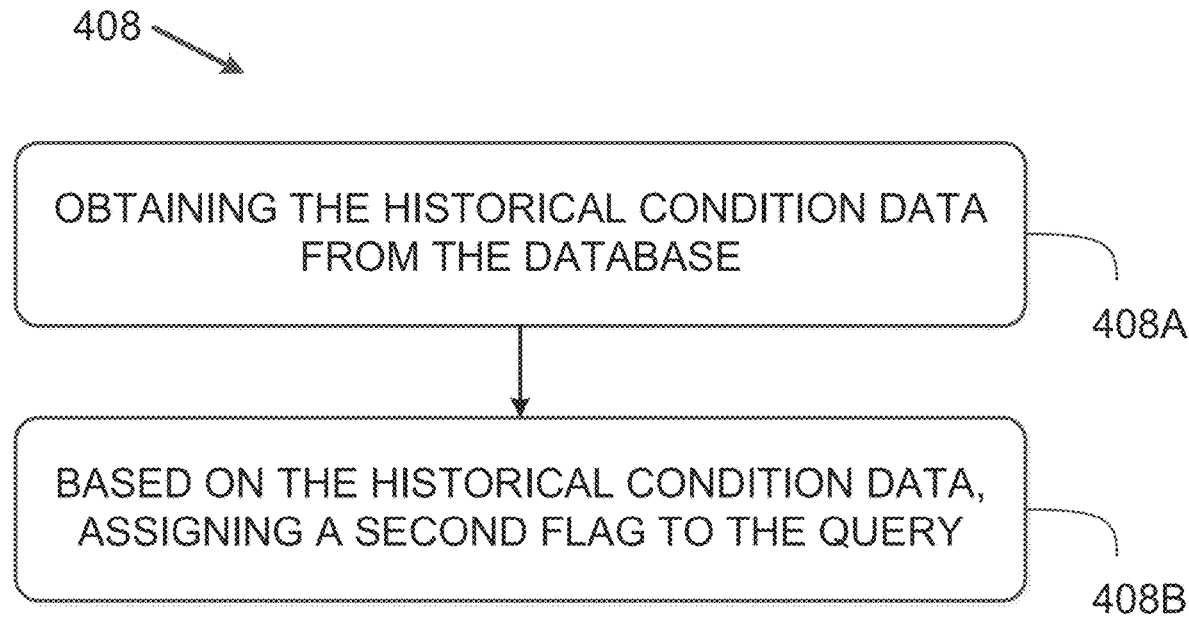

Instantiating the condition model is further described in connection with FIG. 4C. As shown, at step 406A, the query system may obtain the historical condition data from the database. The historical condition data may take any of the forms described above.

At step 406B, the query system may assign a second flag to the query based on the historical condition data. For example, if the historical condition data indicates that that the property may be in good, sound, and/or stable condition, the second flag may be an instruction to assign the query to the streamlined process. As another example, if the historical condition data indicates that the property may be in poor, deteriorating, questionable, and/or unknown condition, the second flag may be an instruction not to assign the query to the streamlined process.

The condition model may be configured to analyze any number of indicators of a condition of the property. For example, the condition model may be configured to analyze a growth in a market price of the property as compared to growth in market prices of other properties in the local market. For instance, the condition model may assign the second flag as an instruction not to assign the query to the streamlined process where the growth in market price of the property is less than 80% of the growth in market prices of the other properties in the local market.

As another example, the condition model may be configured to review condition ratings of prior appraisals. For instance, the condition model may assign the second flag as an instruction to assign the query to the streamlined process where the prior appraisals rate the condition as "good" or better. As still another example, the condition model may be configured to analyze a number of days the property has been on the market as compared to an average number of days properties in the local market are on the market. For instance, the condition model may assign the second flag as an instruction not to assign the query to the streamlined process where the property has been on the market longer than the average number of days properties in the local market are on the market. As still another example, the condition model may be configured to analyze a market price of the property as compared to an average market price in the local market to determine if the property is significantly undervalued, which may be an indicator of poor condition. For instance, the condition model may assign the second flag as an instruction not to assign the query to the streamlined process where the property is significantly undervalued. Other condition indicators may include zoning issues (e.g., illegal zoning), property age (e.g., properties of a certain age), and whether the property was real-estate owned. Other condition indicators are possible as well.

Returning to FIG. 4A, process 400 further includes, at step 410, determining whether to assign the query to the streamlined process. The query system may determine whether to assign the query to the streamlined process based on, for example, the first flag and the second flag assigned in the value model and the condition model, respectively. In some embodiments, if either of the first flag or the second flag is an instruction not to assign the query to the streamlined process, the query system may not assign the query to the streamlined process. Alternatively or additionally, if each the first flag and the second flag is an instruction to assign the query to the streamlined process, the query system may assign the query to the streamlined process.

In some embodiments, the streamlined process may be a process that requires no and/or reduced human and/or data input as compared to a non-streamlined process. While only one streamlined process and one non-streamlined process are described, in some embodiments more than one streamlined process and/or more than one non-streamlined process may be available, and determining whether to assign the query to the streamlined process at step 410 may involve determining which streamlined process and/or which non-streamlined process to which the query should be assigned.

In some embodiments, the assigned streamlined and/or non-streamlined process may depend the first and second flags and/or the value and/or condition models instantiated. For example, a first non-streamlined process may be assigned when only one of the first flag and the second flag is an instruction to assign the query to a non-streamlined process, and a second non-streamlined process may be assigned when both the first flag and the second flag are instructions to assign the query to a non-streamlined process. As another example, a first non-streamlined process may be assigned if the submitted value ratio is not within the predetermined range of the modeled value ratio, and a second non-streamlined process may be assigned if the modeled value ratio exceeds the predetermined maximum. As still another example, a first non-streamlined process may be assigned if a certain condition indicator (e.g., illegal zoning) is present based on the historical condition data, and a second non-streamlined process may be assigned if there is another condition indicator (e.g., property age) present based on the historical condition data. Other examples are possible as well.

Figure 4D:
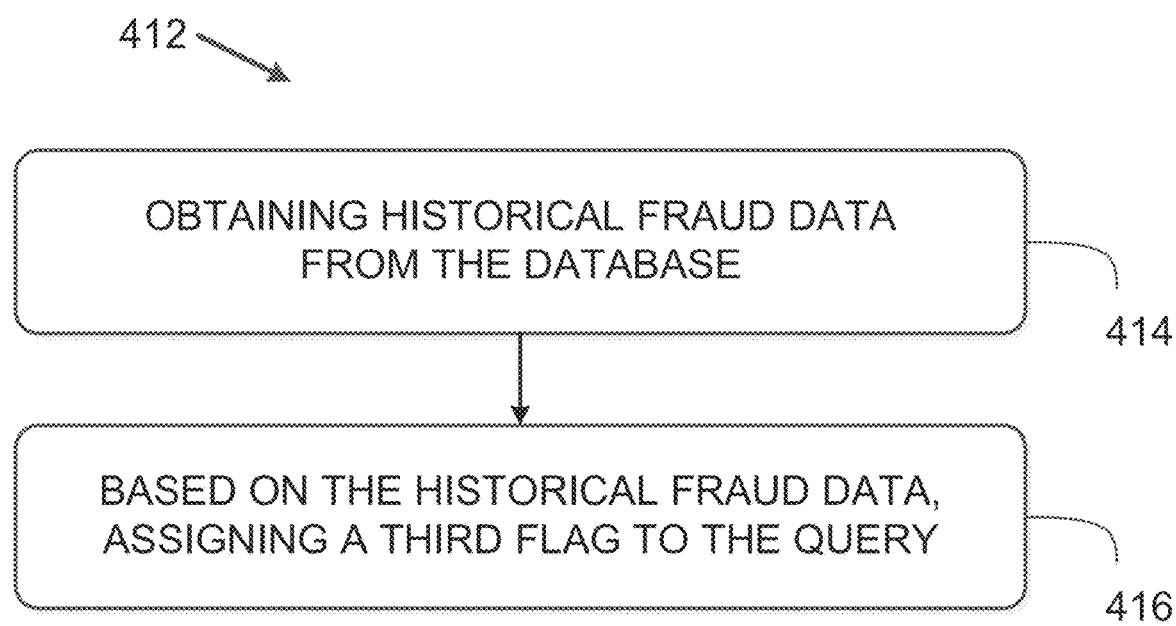

In some embodiments, the query system may be configured to instantiate a fraud model as well. An example process 412 for instantiating a fraud model is shown in FIG. 4D. As shown, process 412 may include obtaining historical fraud data from the database. The historical fraud data may take any of the forms described above. At step 416, the query system may assign a third flag to the query based on the historical fraud data. For example, if the historical fraud data indicates that that the property may be subject to and/or otherwise connected to a fraud, the third flag may be an instruction not to assign the query to the streamlined process. As another example, if the historical fraud data indicates that the property is not subject to and/or otherwise connected to a fraud, the third flag may be an instruction to assign the query to the streamlined process.

The fraud model may be configured to analyze any number of indicators of fraud associated with the property. For example, the fraud model may be configured to detect whether the sale of the property was an arms-length transaction. For instance, the fraud model may assign the third flag as an instruction not to assign the query to the streamlined process where there is a likelihood that the sale was not an arms-length transaction. The fraud model may also use historical value data and/or historical condition data as well as historical fraud data to calculate risk or fraud and set a flag.

In some embodiments, the query system may determine whether to assign the query to the streamlined process based on the third flag, in addition to the first flag and the second flag. For example, if any of the first flag, the second flag, and the third flag is an instruction not to assign the query to the streamlined process, the query system may not assign the query to the streamlined process. Alternatively, if each the first flag, the second flag, and the third flag is an instruction to assign the query to the streamlined process, the query system may assign the query to the streamlined process.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider and merchant have been referred to herein for ease of discussion, it is to be understood that consistent with disclosed embodiments other entities may provide such services in conjunction with or separate from a financial service provider and merchant.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A system comprising:
    a database;
    a processor in communication with the database; and
    a memory device, in communication with the processor, storing instructions that, when executed by the processor, perform operations comprising:
        maintaining at the database a data structure comprising historical value data and historical condition data;
        receiving a query requesting a streamlined process, wherein the query comprises submitted value data;
        based on the query, instantiating a value model by:
            obtaining the historical value data from the database and determining, based on the historical value data, a modeled value ratio,
            determining, based on the submitted value data, a submitted value ratio, wherein the modeled value ratio and the submitted value ratio represent a common characteristic, and wherein the modeled value ratio and the submitted value ratio are determined based on the historical value data and the submitted value data, respectively,
            making a first assessment whether the submitted value ratio is within a predetermined range of the modeled value ratio,
            making a second assessment whether the modeled value ratio exceeds a predetermined maximum, and
            based on the first assessment and the second assessment,
        assigning a first flag to the query;
        further based on the query, instantiating a condition model by:
            obtaining the historical condition data from the database, and
            based on the historical condition data, assigning a second flag to the query, wherein the condition model is configured to determine a quantitative metric by processing one or more qualitative indicators of the historical condition data, and wherein the second flag is assigned based on comparison of the quantitative metric; and
        based on the first flag and the second flag, determining whether to assign the query to the streamlined process.

2. The system of claim 1, wherein:
    if the submitted value ratio is within the predetermined range of the modeled value ratio and the modeled value ratio does not exceed the predetermined maximum, the first flag comprises an instruction to assign the query to the streamlined process; and
    if the submitted value ratio is not within the predetermined range of the modeled value ratio or the modeled value ratio exceeds the predetermined maximum, the first flag comprises an instruction not to assign the query to the streamlined process.

3. The system of claim 1, wherein determining whether to assign the query to the streamlined process based on the first flag and the second flag comprises:
    if either of the first flag or the second flag comprises an instruction not to assign the query to the streamlined process, determining not to assign the query to the streamlined process; and
    if each the first flag and the second flag comprises an instruction to assign the query to the streamlined process, determining to assign the query to the streamlined process.

4. The system of claim 1, wherein the data structure further comprises historical fraud data, the operations further comprising:
    based on the query, instantiating a fraud model by:
        obtaining the historical fraud data from the database, and
        based on the historical fraud data, assigning a third flag to the query,
    wherein determining whether to assign the query to the streamlined process based on the first flag and the second flag comprises determining whether to assign the query to the streamlined process based on the first flag, the second flag, and the third flag.

5. The system of claim 1, wherein determining whether to assign the query to the streamlined process based on the first flag, the second flag, and the third flag comprises:
    if any of the first flag, the second flag, and the third flag comprises an instruction not to assign the query to the streamlined process, determining not to assign the query to the streamlined process; and
    if each the first flag, the second flag, and the third flag comprises an instruction to assign the query to the streamlined process, determining to assign the query to the streamlined process.

6. The system of claim 1, wherein maintaining the data structure comprises aggregating the historical value data and the historical condition data from at least one other database.

7. A method comprising:
    maintaining at a database a data structure comprising historical value data and historical condition data;
    receiving a query requesting a streamlined process, wherein the query comprises submitted value data;
    based on the query, instantiating a value model by:
        obtaining the historical value data from the database and determining, based on the historical value data, a modeled value ratio,
        determining, based on the submitted value data, a submitted value ratio, wherein the modeled value ratio and the submitted value ratio represent a common characteristic, and wherein the modeled value ratio and the submitted value ratio are determined based on the historical value data and the submitted value data, respectively,
        making a first assessment whether the submitted value ratio is within a predetermined range of the modeled value ratio,
        making a second assessment whether the modeled value ratio exceeds a predetermined maximum, and based on the first assessment and the second assessment, assigning a first flag to the query;
further based on the query, instantiating a condition model by:
obtaining the historical condition data from the database, and
based on the historical condition data, assigning a second flag to the query, wherein the condition model is configured to determine a quantitative metric by processing one or more qualitative indicators of the historical condition data, and wherein the second flag is assigned based on comparison of the quantitative metric; and
based on the first flag and the second flag, determining whether to assign the query to the streamlined process.

8. The method of claim 7, wherein:
if the submitted value ratio is within the predetermined range of the modeled value ratio and the modeled value ratio does not exceed the predetermined maximum, the first flag comprises an instruction to assign the query to the streamlined process; and
if the submitted value ratio is not within the predetermined range of the modeled value ratio or the modeled value ratio exceeds the predetermined maximum, the first flag comprises an instruction not to assign the query to the streamlined process.

9. The method of claim 7, wherein determining whether to assign the query to the streamlined process based on the first flag and the second flag comprises:
if either of the first flag or the second flag comprises an instruction not to assign the query to the streamlined process, determining not to assign the query to the streamlined process; and
if each the first flag and the second flag comprises an instruction to assign the query to the streamlined process, determining to assign the query to the streamlined process.

10. The method of claim 7, wherein the data structure further comprises historical fraud data, the operations further comprising:
based on the query, instantiating a fraud model by:
obtaining the historical fraud data from the database, and
based on the historical fraud data, assigning a third flag to the query,
wherein determining whether to assign the query to the streamlined process based on the first flag and the second flag comprises determining whether to assign the query to the streamlined process based on the first flag, the second flag, and the third flag.

11. The method of claim 7, wherein determining whether to assign the query to the streamlined process based on the first flag, the second flag, and the third flag comprises:
if any of the first flag, the second flag, and the third flag comprises an instruction not to assign the query to the streamlined process, determining not to assign the query to the streamlined process; and
if each the first flag, the second flag, and the third flag comprises an instruction to assign the query to the streamlined process, determining to assign the query to the streamlined process.

12. The method of claim 7, wherein maintaining the data structure comprises aggregating the historical value data and the historical condition data from at least one other database.

13. A tangible computer readable media that store software instructions that, when executed by one or more processors, are configured for and capable of performing and executing a method comprising:
maintaining at a database a data structure comprising historical value data and historical condition data;
receiving a query requesting a streamlined process, wherein the query comprises submitted value data;
based on the query, instantiating a value model by:
obtaining the historical value data from the database and determining, based on the historical value data, a modeled value ratio,
determining, based on the submitted value data, a submitted value ratio, wherein the modeled value ratio and the submitted value ratio represent a common characteristic, and wherein the modeled value ratio and the submitted value ratio are determined based on the historical value data and the submitted value data, respectively,
making a first assessment whether the submitted value ratio is within a predetermined range of the modeled value ratio,
making a second assessment whether the modeled value ratio exceeds a predetermined maximum, and
based on the first assessment and the second assessment, assigning a first flag to the query;
further based on the query, instantiating a condition model by:
obtaining the historical condition data from the database, and
based on the historical condition data, assigning a second flag to the query, wherein the condition model is configured to determine a quantitative metric by processing one or more qualitative indicators of the historical condition data, and wherein the second flag is assigned based on comparison of the quantitative metric; and
based on the first flag and the second flag, determining whether to assign the query to the streamlined process.

14. The tangible computer readable media of claim 13, wherein the method further comprises:
if the submitted value ratio is within the predetermined range of the modeled value ratio and the modeled value ratio does not exceed the predetermined maximum, the first flag comprises an instruction to assign the query to the streamlined process; and
if the submitted value ratio is not within the predetermined range of the modeled value ratio or the modeled value ratio exceeds the predetermined maximum, the first flag comprises an instruction not to assign the query to the streamlined process.

15. The tangible computer readable media of claim 13, wherein determining whether to assign the query to the streamlined process based on the first flag and the second flag comprises:
if either of the first flag or the second flag comprises an instruction not to assign the query to the streamlined process, determining not to assign the query to the streamlined process; and
if each the first flag and the second flag comprises an instruction to assign the query to the streamlined process, determining to assign the query to the streamlined process.

16. The tangible computer readable media of claim 13, wherein the data structure further comprises historical fraud data, the method further comprising:
based on the query, instantiating a fraud model by:
obtaining the historical fraud data from the database, and based on the historical fraud data, assigning a third flag to the query, wherein determining whether to assign the query to the streamlined process based on the first flag and the second flag comprises determining whether to assign the query to the streamlined process based on the first flag, the second flag, and the third flag.

17. The tangible computer readable media of claim 13, wherein determining whether to assign the query to the streamlined process based on the first flag, the second flag, and the third flag comprises:

if any of the first flag, the second flag, and the third flag comprises an instruction not to assign the query to the streamlined process, determining not to assign the query to the streamlined process; and if each the first flag, the second flag, and the third flag comprises an instruction to assign the query to the streamlined process, determining to assign the query to the streamlined process.

18. The tangible computer readable media of claim 13, wherein maintaining the data structure comprises aggregating the historical value data and the historical condition data from at least one other database.

* * * * *